United States Patent
Lipcsei

(10) Patent No.: US 7,196,499 B1
(45) Date of Patent: Mar. 27, 2007

(54) DC/DC CONVERTER WITH INDUCTOR CURRENT SENSING CAPABILITY

(75) Inventor: Laszlo Lipcsei, Campbell, CA (US)

(73) Assignee: 02Micro, Inc., Taipei (TW)

( * ) Notice: Subject to any disclaimer, the term of this patent is extended or adjusted under 35 U.S.C. 154(b) by 0 days.

(21) Appl. No.: 11/524,862

(22) Filed: Sep. 21, 2006

Related U.S. Application Data

(60) Provisional application No. 60/720,754, filed on Sep. 27, 2005.

(51) Int. Cl.
*G05F 1/00* (2006.01)
*G05F 1/613* (2006.01)

(52) U.S. Cl. .................. 323/222; 323/282; 323/284

(58) Field of Classification Search ............. 323/222, 323/282, 284, 283, 285
See application file for complete search history.

(56) References Cited

U.S. PATENT DOCUMENTS

| | | | |
|---|---|---|---|
| 5,777,866 A * | 7/1998 | Jacobs et al. ............... | 363/126 |
| 5,982,160 A * | 11/1999 | Walters et al. .............. | 323/282 |
| 6,642,696 B2 * | 11/2003 | Tateishi ...................... | 323/222 |
| 6,737,845 B2 * | 5/2004 | Hwang ........................ | 323/284 |
| 6,940,189 B2 * | 9/2005 | Gizara ........................ | 307/151 |
| 7,031,174 B2 * | 4/2006 | Lipcsei ........................ | 363/98 |

* cited by examiner

*Primary Examiner*—Bao Q. Vu
(74) *Attorney, Agent, or Firm*—Carlton Fields, PA; Li K. Wang

(57) ABSTRACT

A DC/DC converter for converting an input voltage to an output voltage comprises a switch, an inductor, two voltage dividers, a capacitor, and a controller. The switch coupled to the input voltage. The inductor having a parasitic direct current resistance is used for coupling the switch to an output node of the DC/DC converter so as to generate the output voltage at the output node. The first voltage divider is coupled to the output node for generating a divided voltage of the output voltage. The second voltage divider is coupled to the switch and ground. The capacitor coupled to the first voltage divider and the second divider to measure the current through the inductor by sensing a voltage across the capacitor. The controller coupled to the first switch for enabling and disenabling it so as to discontinuously providing power from the input voltage to the inductor.

19 Claims, 3 Drawing Sheets

DC/DC CONVERTER WITH INDUCTOR CURRENT SENSING CAPABILITY

CROSS REFERENCE TO RELATED APPLICATION

This application claims the benefit of U.S. Provisional Patent Application Ser. No. 60/720,754, entitled "Divided Inductor DCR Current Sensing," filed on Sep. 27, 2005, the specification of which is hereby incorporated in its entirety by this reference.

TECHNICAL FIELD

The invention relates to power management for electrical circuit, and more particularly to DC/DC converter.

BACKGROUND OF THE INVENTION

Direct-current to direct current (DC/DC) converters are widely used in the field of electronics to convert an input DC voltage to a predetermined stable output DC voltage higher or lower than the input DC voltage. Such circuitry or devices, which typically have semiconductor switching-control topology, are highly efficient and small in dimensions, and therefore constitute an important part for power supplies in various electronic apparatuses. A DC/DC converter has a controller, which receives feedback signals, such as current and voltage feedback signal, to adjust the output voltage or current to a desired level.

Typically, the current information can be obtained by sensing the current through an inductor of a DC/DC converter, and can be used as a current feedback signal. Several current sensing approaches are used to detect the current passing through the inductor. One of the methods is to use a current sensing resistor coupled in series to an output inductor to sense the current. The current flowing through the current sense resistor is equal to the voltage across the current sense resistor divided by the resistance of the current sense resistor. This method obviously incurs a power loss on the current sense resistor.

For improved efficiency, another method for detecting current is to use the inductor series resistance, also known as Direct Current Resistance (DCR), of an inductor as the current-sensing element. A resistor and a capacitor coupled with each other in series are coupled in parallel with the inductor. When the time constant of the resistor and the capacitor is matched to the time constant of the inductor and the inductor series resistance, the current through the inductor can be determined by sensing the voltage across the capacitor.

Referring to FIG. 1, a DC/DC converter 100 in the prior art is illustrated. The DC/DC converter 100 is a typical buck DC/DC converter having a resistor and capacitor network 117 for sensing the current through an inductor 106. A MOSFET 102 is coupled to the inductor 106 in order to discontinuously or intermittently couple an input DC voltage (Vin) to the inductor 106, and to apply an output voltage to a load 130. The inductor 106 has an inductor parasitic DCR resistor 108. In an equivalent model, the inductor 106 and the DCR resistor 108 are coupled to each other in series as shown in FIG. 1. A voltage divider comprises resistors 112 and 114 are coupled to an output voltage of the DC/DC converter 100 for generating a divided voltage of the output voltage. The resistor and capacitor network 117 comprises a resistor 116 and a capacitor 110 which are coupled to each other in series and coupled in parallel to the inductor 106 and the DCR resistor 108. As shown in FIG. 1, the resistor 116 and the capacitor 110 are coupled to the inductor 106 and the inductor parasitic DCR resistor 108 in parallel so as to form a resistor and capacitor network to sense the current through the inductor 106. A MOSFET 104 is coupled to the MOSFET 102 to discharge the inductor 106 when the MOSFET 102 is turned off. The DC/DC converter 100 also has a controller 120 which will be discussed in detail below.

The controller 120 has a HDR pin and a LDR pin which are coupled to the MOSFETs 102 and 104 to enable or disable the MOSFETs 102 and 104, respectively. Two terminals of capacitor 110 are coupled to a CSP pin and a CSN pin of the controller 120 such that the voltage across the capacitor 110 is sensed or received by the controller 120. An FB pin of controller 120 is coupled to the node between the resistor 112 and the resistor 114 for receiving a feedback voltage signal, which is the divided output voltage.

Those skilled in the art will recognize that a voltage across the capacitor 110 is equal to the inductor current times the resistance of the DCR resistor 108 if the inductor time constant matches with the time constant of the resistor and capacitor network, i.e., the Equation (1) should be satisfied as follows:

$$L/DCR = R*C \qquad (1)$$

Where L is the inductance of the inductor 106, DCR is the resistance of the inductor DCR resistor 108, R is the resistance of the resistor 116, and C is the capacitance of the capacitor 110. The current through the inductor 106 is equal to the voltage across the capacitor 110 divided by the resistance of the DCR resistor 108. The resistance of the DCR resistor 108 is known and the voltage across the capacitor 110 can be sensed or measured by the inputs of the CSP and CSN pins of the controller 120. As such, the controller 120 can sense the current through the inductor 106 and use the current information to control the MOSFET 102 and 104.

However, because the voltage at the CSN pin of the controller 120 is equal to the output voltage of the DC/DC converter 100. Once the output voltage is high, the output voltage is transmitted into the CSN pin of the controller 120 and may cause damage to the controller 120.

Therefore, it is desirable to have a DC/DC converter capable of providing an improved inductor current sensing capability and it is to a such DC/DC converter this invention is primarily directed.

SUMMARY OF THE INVENTION

In one embodiment, there is provided a DC/DC converter for converting an input voltage to an output voltage. The DC/DC converter comprises a switch, an inductor, two voltage dividers, a capacitor, and a controller. The switch coupled to the input voltage. The inductor having a parasitic direct current resistance is used for coupling the switch to an output node of the DC/DC converter so as to generate the output voltage at the output node. The first voltage divider is coupled to the output node for generating a divided voltage of the output voltage. The second voltage divider is coupled between the switch and ground. The capacitor coupled to the first voltage divider and the second divider to measure the current through the inductor by sensing a voltage across the capacitor. The controller coupled to the first switch for enabling and disenabling it so as to discontinuously providing power from the input voltage to the inductor.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DETAIL DESCRIPTION OF THE INVENTION

Reference will now be made in detail to the embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be appreciated by one of ordinary skill in the art that the present invention may be practiced without these specific details. In other instances, well known methods, procedures, components, and circuits have not been described in detail as not to unnecessarily obscure aspects of the present invention.

Figure 2:
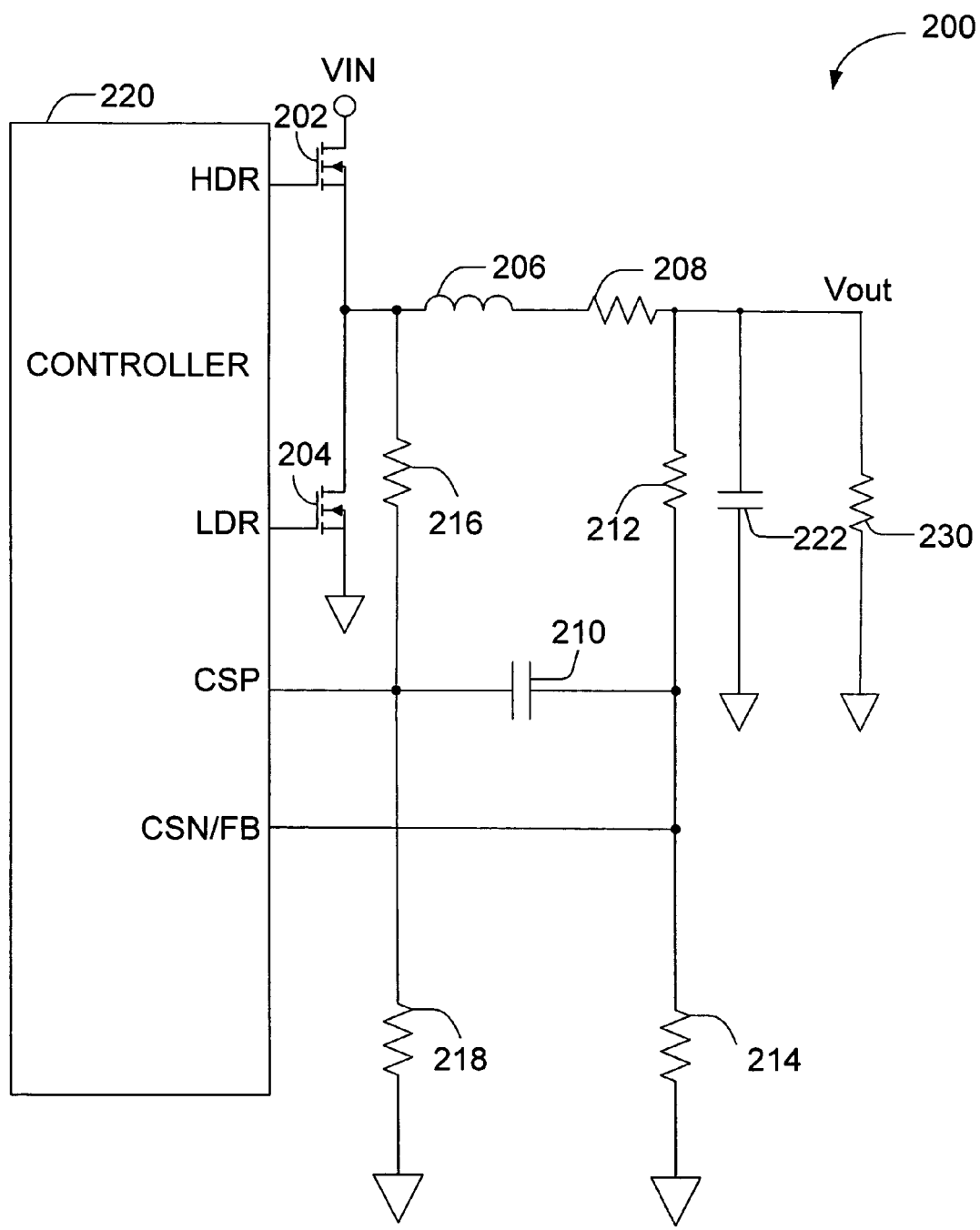
FIG. 2 is a diagram showing a DC/DC converter with an improved inductor current sensing network according to one embodiment of the invention.

Referring to FIG. 2, a DC/DC converter 200 with an inductor current sensing circuit according to one embodiment of the present invention is illustrated. The DC/DC converter 200 is used to convert an input voltage to a predetermined output voltage for a load 230, and comprises switches 202 and 204, an inductor 206, a capacitor 222, resistors 212, 214, 216, and 218, a capacitor 210, and a controller 220. The switch 202 couples the input voltage (Vin) of the DC/DC converter 200 to the inductor 206. The switch 204 is coupled to the switch 202 and the inductor 206. The switches 202 and 204 formed a switching circuit for receiving and converting the input voltage to the predetermined output voltage. In accordance with one embodiment of the present invention, the switches 202 and 204 are N-type MOS transistors.

It will be apparent to those skilled in the art that the switch 204 can be a diode, in accordance with another embodiment of the present invention. The cathode of the diode is coupled to the switch 202, and the anode of the diode is coupled to ground. In the embodiment, the diode will be turned on to provide a discharge path when the switch 202 is turned off. In accordance with further embodiment of the present invention, the switches 202 and 204 are P-type MOS transistors.

One end of the inductor 206 is coupled to the switch 202 and the other is coupled to the output node of the DC/DC converter 200. The capacitor 222 is coupled the output node of the DC/DC converter 200 to ground. The inductor 206 and the capacitor 222 form a low pass filter to smooth the output of the DC/DC converter 200.

The inductor 206 has a parasitic direct current resistance (DCR) resistor 208. In an equivalent model of the inductor 206, as shown in FIG. 2, the inductor 206 and the parasitic resistor 208 are coupled with each other in series.

A first voltage divider, which comprises the resistors 212 and 214 coupled with each other in series, is coupled to output terminal for generating a divided voltage of the output voltage. A second voltage divider, which comprises the resistor 216 and 218 coupled with each other in series, is coupled to the inductor 206 and the first switch 202. A capacitor 210 is coupled between the first voltage divider and the second voltage divider such that the measurements of the current passing through the inductor 206 can be taken around the capacitor 210, which will be described in detail hereinafter.

The controller 220 according to one embodiment of the present invention is an integrated circuit (IC) and comprises a HDR pin, a LDR pin, a CSP pin, and a CSN/FB pin. The HDR pin of the controller 220 is coupled to the switch 202 to control the conductive state of the switch 202. The average voltage at the node between the switch 202 and the inductor 206 will depend on the average conductive time of the switch 202. Thus, the output voltage of the DC/DC converter can be controlled by means of changing the conductive time of switch 202. In accordance with one embodiment of the present invention, a Pulse Width Modulation (PWM) signal is delivered from the HDR pin of the controller 220 to regulate the output voltage of the DC/DC converter 200 to a predetermined output voltage. The LDR pin of controller 220 is coupled to the switch 204 to enable it when the switch 202 is disabled. Similarly, a PWM control signal can be delivered from the LDR pin of the controller 220 to switch 204.

In accordance with one embodiment of the present invention, a first PWM signal is used to enable and disenable the switch 202 and a second PWM signal is used to enable and disable the switch 204. The first and second PWM signals may be the inverse of each other with an overlap disabling short period of time in order to avoid enabling both the switches 202 and 204 at the same time.

Referring back to FIG. 2, the CSN/FB pin of the controller 220 is coupled to the node between the resistors 212 and 214. Since the two resistors 212 and 214 are formed as the first voltage divider for coupling the output voltage to ground, the signal at the node between the resistors 212 and 214 is proportional to the output voltage of the DC/DC converter 200 and can be used as a voltage feedback signal. The voltage signal Vref at the CSN/FB pin of the controller 220 can be calculated in Equation (2) as follows:

$$Vref = Vout * R_{214} / (R_{212} + R_{214}) \quad (2)$$

Where Vout is the output voltage of the DC/DC converter 200, and $R_{212}$ and $R_{214}$ are the resistances of the resistors 212 and 214, respectively. As such, the controller 220 can only comprise one pin to serve as two functions, one is for getting the voltage drop signal of capacitor 210, and the other is for getting the divided voltage feedback signal. Thus, the pin count of the controller 220 can be reduced.

Furthermore, the switch 202 is turned on and off alternatively, and thus the input DC voltage will be discontinuously applied to the inductor 206. At the node between the switch 202 and inductor 206, a square wave voltage is generated. The capacitor 210 is coupled between the first voltage divider, the resistors 212 and 214, and the second voltage divider, the resistors 216 and 216. In accordance with one embodiment of the present invention, the resistance of resister 216 is substantially larger than that of the resister 212, and the resistance of the resister 218 is substantially larger than that of the resister 214 so as to minimize the square wave signal induced into the CSN/FB pin of the controller 220 and keep the signal received at the CSN/FB pin as stable as possible. Substantially larger means that the resistance of one resistor is at least one hundred times larger than the resistance of another resistor. In accordance with one embodiment of the present invention, the resistance of the resistor 216 is several hundred times larger than that of the resistor 212, and the resistance of the resistor 218 is several hundred times larger than that of the resistor 214.

As mentioned above, the capacitor 210 are coupled between the first and the second voltage dividers. The CSP pin and the CSN/FB pin of the controller 220 are coupled to the two ends of the capacitor 210, respectively. The voltage drop across the capacitor 210 can be obtained or measured by the controller 220. In order to measure or sense the current passing through the inductor 206, the inductor time constant of the inductor 206 and the DCR resistor 208 should match the time constant of the RC network. The inductance and the resistance of inductor 206 and resistor 208 are L and DCR, respectively, and the time constant of the inductor 206 should be L/DCR. The RC network, as shown in FIG. 2, includes the resisters 212, 214, 216, 218 and the capacitor 210. As mentioned above, the resistors 212 and 214 are far less than the resistors 216 and 218, respectively. The resistances of the resistors 212 and 214 can be neglected to calculate the time constant of the RC network. The RC network time constant value can be calculated in Equation (3) as follows:

$$T_{RC}=R_{216}//R_{218}*C=R_{216}*R_{218}/(R_{216}+R_{218})*C \quad (3)$$

Where $T_{RC}$ is the time constant of the RC network, C is the capacitance of the capacitor 210, and $R_{216}$ and $R_{218}$ are the resistances of the resistors 216 and 218. Once the time constant of the RC network is equal the time constant of the inductor 206, i.e., $T_{RC}$ is equal to $L/R_{DCR}$, the voltage across the DCR resistor 208 is equal to the voltage across the capacitor 210, which can be sensed by the controller 220. Consequently, the current through the inductor 206 can be measured or calculated.

Furthermore, it will be apparent to those skilled in the art that the resistances of the resistors 212, 214, 216, and 218 needed to satisfy the Equation (4) as follows:

$$R_{218}/(R_{216}+R_{218})=R_{214}/(R_{212}+R_{214}) \quad (4)$$

Where $R_{212}$, $R_{214}$, $R_{216}$, $R_{218}$ are the resistances of the resistors 212, 214, 216, 218, respectively. As such, the divided ratio between the first voltage divider and the second voltage divider is equal to each other.

The controller 220 enables or disables the switches 202 and 204 in response to the signals received at the CSP pin and the CSN/FB pin. In accordance with one embodiment of the present invention, a first PWM signal is transmitted to the switches 202 to discontinuously enable the switch 202. A second PWM signal, which is the inverse of the first PWM signal, is transmitted to the switch 204. The pulse duty factor of the first PWM signal is adjusted according to the signals received at the CSP and the CSN/FB pins. As a result, the DC/DC controller 220 is able to adjust the output voltage of the DC/DC converter 200 to a predetermined value.

Figure 1:
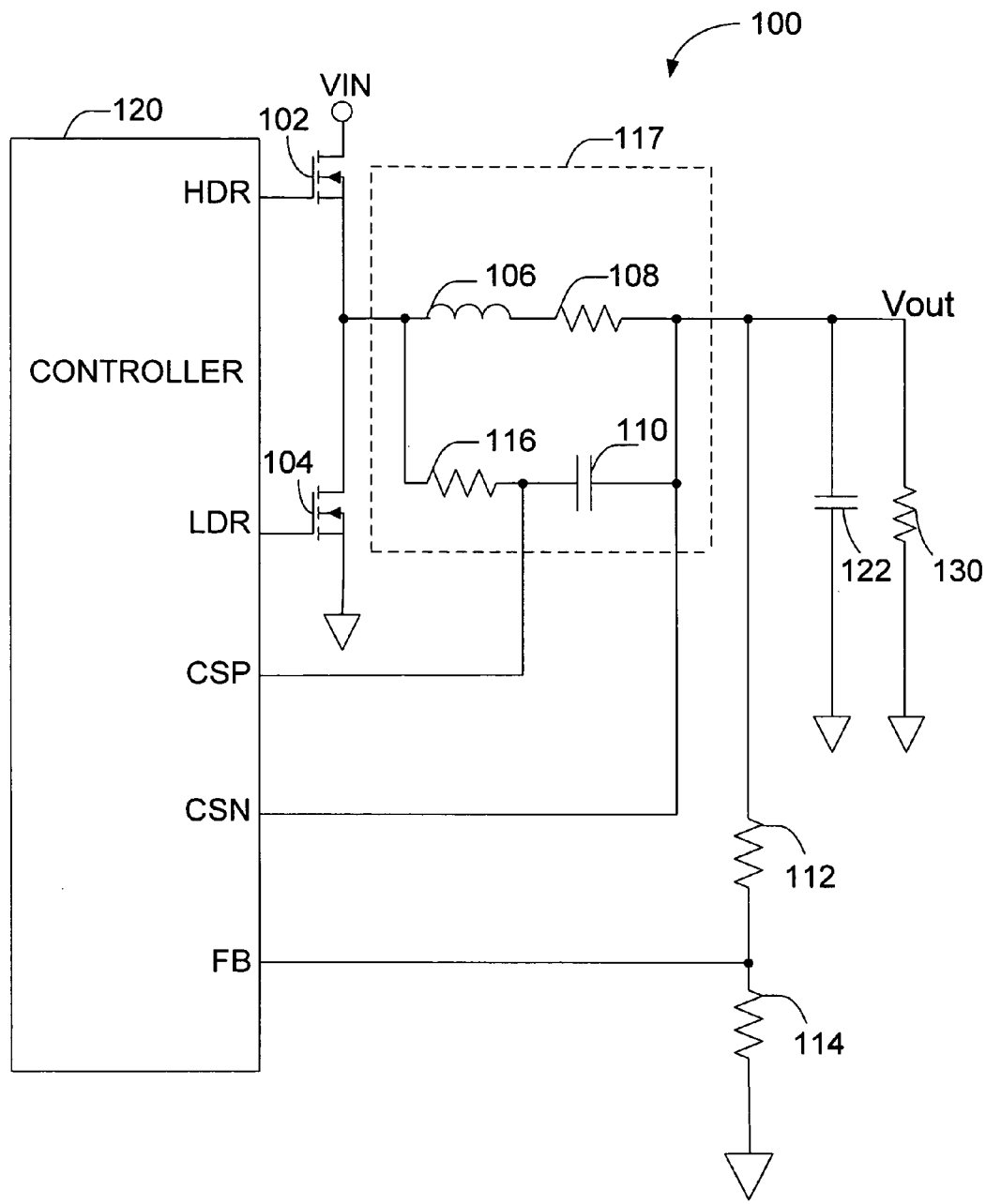
FIG. 1 is a diagram showing a prior art DC/DC converter with a conventional inductor current sensing network.

Compared with the DC/DC converter 100 shown in FIG. 1, the voltage at the CSN/FB pin of controller 220 is scaled down to Vout/(R1+R2)*R2 rather than the output voltage Vout. In other words, the range of the output voltage can be extended to higher voltages while the voltage received at the CSN/FB pin of controller 220 can still be kept at a relatively low level. Furthermore, the received voltage at the CSN/FB pin of the controller 220 is proportional to the output voltage of the DC/DC converter 200, and can be used as a feedback voltage signal. The pin count of the controller 220 is reduced.

It should be noted that the spirit of present invention can be applied to any type of buck or boost DC/DC converter. Furthermore, it may also be applicable to other types of power converters.

Figure 3:
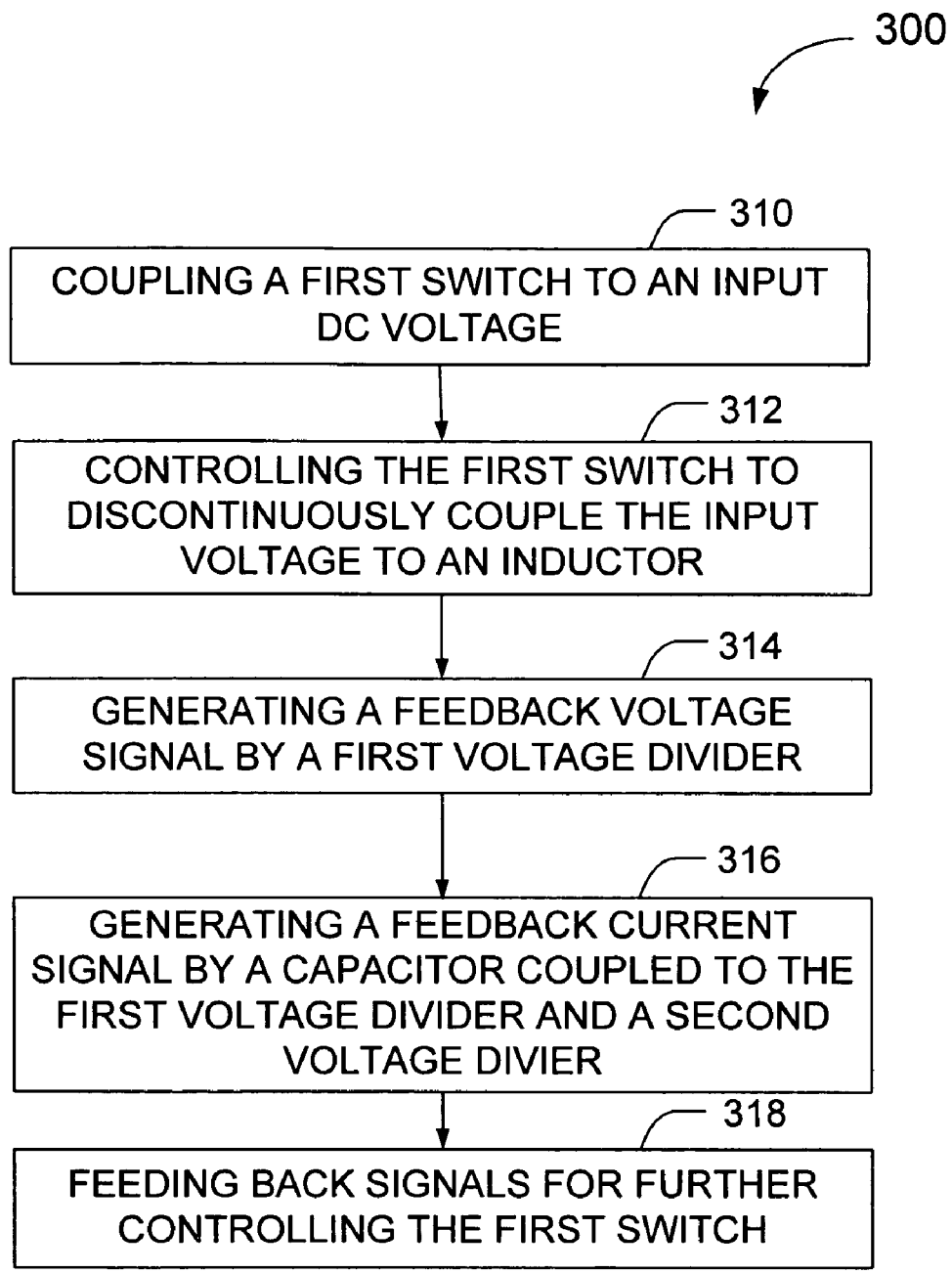
FIG. 3 is a flowchart showing a method for converting an input DC voltage to an output DC voltage, in accordance with one embodiment of the present invention.

Referring to FIG. 3, a method 300 for converting an input DC voltage to a predetermined output DC voltage is illustrated. As shown in FIG. 3, at 310, a first switch is coupled to the input DC voltage. An inductor is further coupled to the first switch to output the predetermined output DC voltage at an output terminal of the inductor.

At 312, the first switch is turned on and off alternative to discontinuously apply the input DC voltage to the inductor. An output capacitor is coupled to the inductor for reducing the ripple voltage at the output terminal. A second switch is used to couple the first switch to ground. The second switch will be enabled or turned on to provide a discharging path when the first switch is disenabled or turned off. In accordance with one embodiment of the present invention, a PWM signal is used to control the first switch, and a second PWM signal, which is the inverse of the first PWM signal, is used to control the second switch. The pulse duty factor of the first PWM signal can be varied to adjust or modify the average voltage of the output voltage.

At 314, a first voltage divider, which comprises a first resistor and a second resistor coupled with each other in series, is coupled to the output terminal and ground. As such, a voltage signal which is generated at the node between the first and the second resistor and proportional to the voltage at the output terminal, serves as a feedback voltage signal.

At 316, a second voltage divider, which comprises a third resistor and a fourth resistor coupled with each other in series, is coupled to the inductor and ground. A capacitor is coupled to the first and the second voltage dividers. In other words, one end of the capacitor is coupled to the first and the second resistors, and the other end of the capacitor is coupled to the third and the fourth resistors. It will be apparent to those skilled in the art that the first and the second resistors are far less than the third and the fourth resistors, respectively. The ratio between the third resistor and the forth resistor should be equal to the ratio between the first resistor and the second resistor. When the time constant of the inductor, which has an inherent parasitic DCR resistor, matches or is equal to the time constant of the capacitor and the third and the fourth resistors, the voltage across the capacitor is equal the current through the inductor times the resistance of the parasitic DCR resistor. As such, the voltage across the capacitor can be sensed to serve as a feedback current signal.

At 318, the feedback voltage signal and the feedback current signal are fed back to the first PWM signal so as to further control the first switch and then precisely generate the predetermined output DC voltage at the output terminal. It will be apparent to those skilled in the art that a controller can be provided to receive the feedback voltage and the feedback current signals, and control the first and the second switches.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A DC/DC converter for converting an input voltage to a predetermined output voltage at an output node, comprising:
    a first switch for receiving said input voltage;
    an inductor for coupling said first switch to said output node of said DC/DC converter such that said output voltage being generated at said output node;
    a first voltage divider coupled to said output node for generating a divided voltage;
    a second voltage divider coupled between said first switch and ground;
    a capacitor coupled between said first voltage divider and said second voltage divider, the capacitor being capable of measuring a current passing through said inductor by sensing a voltage across said capacitor, and
    a controller coupled to said first switch for enabling and disenabling said first switch such that power being discontinuously provided from said input voltage to the inductor and said output voltage being adjusted to a predetermined level.

2. The DC/DC converter of claim 1, wherein said controller being capable of receiving said divided voltage, said divided voltage serving as a feedback signal from said output voltage to said controller.

3. The DC/DC converter of claim 2, wherein said controller being capable of sensing a voltage across said capacitor such that said current passing through said inductor being determined.

4. The DC/DC converter of claim 3, wherein said controller being capable of generating a PWM signal for enabling said switch.

5. The DC/DC converter of claim 1, further comprising a second switch for coupling said first switch and said inductor to ground such that a discharging path being provided.

6. The DC/DC converter of claim 5, wherein said controller being coupled to said second switch for enabling and disenabling said second switch.

7. The DC/DC converter of claim 6, wherein said controller being capable of generating a second PWM signal for enabling said second switch.

8. The DC/DC converter of claim 1, wherein said first voltage divider further comprises:
    a first resistor coupled to said output node of said DC/DC converter, and
    a second resistor for coupling said first resistor to ground.

9. The DC/DC converter of claim 1, wherein said second voltage divider comprises:
    a third resistor having a resistance that is substantially larger than a resistance of said first resistor, said third resistor being coupled to said first switch, and
    a fourth resistor having a resistance that is substantially larger than a resistance of said second resister, said fourth resistor coupling said third resistor to ground.

10. The DC/DC converter of claim 9, wherein a ratio between said third resistor and said forth resistor being equal to a ratio between said first resistor and said second resistor.

11. The DC/DC converter of claim 1, further comprising:
    an output capacitor coupled to said output node of said DC/DC converter for reducing a ripple voltage at said output node.

12. A method for converting an input DC voltage to a predetermined DC voltage at an output terminal, comprising the steps of:
    receiving an input DC voltage at a first switch;
    controlling said first switch to discontinuously coupling said input DC voltage to an inductor for generating an output DC voltage;
    generating a feedback voltage signal at a first voltage divider coupled to said output terminal, wherein said feedback voltage signal being proportional to a voltage at said output terminal;
    generating a feedback current signal at a capacitor coupled to said first voltage divider and a second voltage divider, wherein said second voltage divider being coupled to said inductor, and wherein said feedback current signal being proportional to a current through said inductor; and
    receiving said feedback voltage signal and said feedback current signal such that said output DC voltage being adjusted to a predetermined level.

13. The method of claim 12, further comprising the step of:
    reducing a ripple voltage at said output terminal by coupling an output capacitor to said output terminal.

14. The method of claim 12, wherein said step of controlling said first switch further comprises the step of:
    controlling said switch with a PWM signal.

15. The method of claim 12, further comprising the step of:
    providing a discharging path by coupling a second switch to said first switch and ground.

16. The method of claim 12, wherein a time constant of said inductor matches with a time constant of said capacitor and said second voltage divider.

17. The method of claim 16, wherein said first voltage divider comprises a first resistor coupled to said output terminal, and a second resistor for coupling said first resistor to ground such that said feedback voltage signal being generated at a node between said first and said second resistors.

18. The method of claim 17, wherein said second voltage divider comprises a third resistor coupled to said inductor and a fourth resistor for coupling said third resistor to ground, said capacitor coupled to said first, said second, said third, and said fourth resistors, and said feedback current signal being a voltage across said inductor.

19. The method of claim 18, wherein a ratio between said third resister and said fourth resistor being equal to a ratio between said first resister and said second resistor.

* * * * *